(12) United States Patent
Tang

(10) Patent No.: US 11,835,072 B2
(45) Date of Patent: Dec. 5, 2023

(54) ULTRASONIC AIRFLOW SEVERING RESISTANCE REDUCING DEVICE FOR VEHICLES

(71) Applicant: Lahui Tang, Guangdong (CN)

(72) Inventor: Lahui Tang, Guangdong (CN)

( * ) Notice: Subject to any disclaimer, the term of this patent is extended or adjusted under 35 U.S.C. 154(b) by 156 days.

(21) Appl. No.: 17/667,556

(22) Filed: Feb. 9, 2022

(65) Prior Publication Data
US 2022/0252092 A1 Aug. 11, 2022

(30) Foreign Application Priority Data

Feb. 10, 2021 (CN) .......................... 202110182203.7

(51) Int. Cl.
| | | |
|---|---|---|
| *F15D 1/00* | (2006.01) | |
| *F16F 15/08* | (2006.01) | |
| *F16F 15/067* | (2006.01) | |
| *B61D 17/02* | (2006.01) | |
| *B62D 35/00* | (2006.01) | |
| *F16F 15/023* | (2006.01) | |
| *F16F 15/02* | (2006.01) | |
| *B64C 1/38* | (2006.01) | |
| *F15D 1/12* | (2006.01) | |
| *B63B 1/32* | (2006.01) | |
| *B64C 23/00* | (2006.01) | |

(52) U.S. Cl.
CPC .............. *F15D 1/007* (2013.01); *B61D 17/02* (2013.01); *B62D 35/00* (2013.01); *B62D 35/005* (2013.01); *B63B 1/32* (2013.01); *B64C 1/38* (2013.01); *B64C 23/005* (2013.01); *F15D 1/00* (2013.01); *F15D 1/12* (2013.01); *F16F 15/02* (2013.01); *F16F 15/023* (2013.01); *F16F 15/0232* (2013.01); *F16F 15/067* (2013.01); *F16F 15/08* (2013.01); *Y02T 10/82* (2013.01)

(58) Field of Classification Search
CPC ... F15D 1/007; F15D 1/12; F15D 1/00; B62D 35/005; B62D 35/00; B63B 1/32; B61D 17/02; B64C 23/005; B64C 1/38; F16F 15/02; F16F 15/023; F16F 15/0232; F16F 15/067; F16F 15/08; Y02T 10/82
USPC .............................. 137/13; 244/213, 91, 99.2
See application file for complete search history.

(56) References Cited

U.S. PATENT DOCUMENTS

| | | | |
|---|---|---|---|
| 3,119,333 A * | 1/1964 | Loughran | ................. B64C 1/38 244/119 |
| 6,412,853 B1 * | 7/2002 | Richardson | ............ B62D 35/00 296/180.1 |

(Continued)

*Primary Examiner* — Minh Q Le

(57) ABSTRACT

An ultrasonic airflow severing resistance reducing device for vehicles, including an airflow severing blade assembly, shock-absorbing installation assemblies, ultrasonic vibration components, and a rubber sealing ring assembly; a bottom portion of the airflow severing assembly is provided with an accommodating cavity; a top end of each shock-absorbing installation assembly is fixedly connected to an inner cavity wall of the accommodating cavity; a bottom end of each shock-absorbing installation assembly is formed with a fixed installation bottom portion; the ultrasonic vibration components are installed on the inner cavity wall; the rubber sealing ring assembly is arranged and installed on the airflow severing blade assembly. The ultrasonic vibration components drive the airflow severing blade assembly to generate high frequency ultrasonic vibration to sever airflow.

10 Claims, 5 Drawing Sheets

(56) References Cited

U.S. PATENT DOCUMENTS

| | | | | |
|---|---|---|---|---|
| 7,357,442 B1* | 4/2008 | Drews | B62D 35/00 | |
| | | | 296/180.1 | |
| 8,556,215 B1* | 10/2013 | Schmidt | B64C 21/10 | |
| | | | 244/91 | |
| 2005/0163963 A1* | 7/2005 | Munro | B64C 21/10 | |
| | | | 428/88 | |
| 2009/0294596 A1* | 12/2009 | Sinha | B64C 21/08 | |
| | | | 244/200 | |
| 2011/0186685 A1* | 8/2011 | Tsotsis | F15D 1/12 | |
| | | | 428/167 | |
| 2013/0255796 A1* | 10/2013 | Dimascio | F03D 7/022 | |
| | | | 137/334 | |
| 2019/0202547 A1* | 7/2019 | Wu | B64C 21/10 | |
| 2019/0270485 A1* | 9/2019 | Gaylard | B62D 25/12 | |
| 2020/0031456 A1* | 1/2020 | Wine | B62D 35/00 | |
| 2020/0300332 A1* | 9/2020 | Halladin | F16F 15/0275 | |
| 2021/0071691 A1* | 3/2021 | Takizawa | F15D 1/0075 | |
| 2021/0231142 A1* | 7/2021 | Smith | B64C 21/10 | |
| 2021/0276665 A1* | 9/2021 | Tan | F15D 1/007 | |
| 2021/0354767 A1* | 11/2021 | Morikawa | B62D 35/02 | |
| 2022/0009565 A1* | 1/2022 | Egarter | B62D 35/001 | |
| 2022/0154744 A1* | 5/2022 | Aoyanagi | F15D 1/005 | |
| 2022/0290699 A1* | 9/2022 | Williams | F15D 1/003 | |

* cited by examiner

ULTRASONIC AIRFLOW SEVERING RESISTANCE REDUCING DEVICE FOR VEHICLES

BACKGROUND OF THE INVENTION

The present invention relates to the field of vehicles, and more particularly to a component installed on vehicles to reduce their driving resistance, flying resistance, or sailing resistance.

As well-known, airflow contains certain humidity and entrains numerous ultra-micro substances; the humidity and substances entrained in the airflow render the airflow with certain viscosity. Regardless of whether they are aircraft flying in the sky, vehicles driving on land, or vessels sailing on water, they are all subject to air resistance and resistance caused by enwrapping air viscosity in varying degrees during flying, driving or sailing; when these vehicles travel faster, they encounter greater resistance which significantly affects their travel speed, maximum travel distance and energy consumption. To reduce air resistance of these vehicles during travel, experts in the industry currently focus on optimizing the aerodynamics of vehicles, but there are enormous difficulties for improvement.

BRIEF SUMMARY OF THE INVENTION

It is an object of the present invention to solve the aforementioned problems and drawbacks by providing an ultrasonic airflow severing resistance reducing device for vehicles; the airflow severing resistance reducing device comprises an airflow severing blade assembly, shock-absorbing installation assemblies, ultrasonic vibration components, and a rubber sealing ring assembly; during operation, the ultrasonic vibration components drive the airflow severing blade assembly to generate high frequency ultrasonic vibrations which sever, break down and destroy air resistance and resistance caused by enwrapping air viscosity, so that the air resistance and the resistance caused by enwrapping air viscosity will not drag a vehicle travelling in high speed, thereby reducing the air resistance and frictional resistance caused by air viscosity during travelling of the vehicle, so as to increase travel speed and reduce energy consumption of the vehicle, and increase travel distance.

The technical solution of the present invention is achieved as follows: An ultrasonic airflow severing resistance reducing device for vehicles, comprising an airflow severing blade assembly, the airflow severing blade assembly is a flat strip-shaped piece with an upper portion and a lower portion, the upper portion is narrower than the lower portion, and a bottom portion of the airflow severing blade assembly along a lengthwise direction thereof is provided with an accommodating cavity; also comprising shock-absorbing installation assemblies, a top end of each shock-absorbing installation assembly is fixedly connected to an inner cavity wall of the accommodating cavity, a bottom end of each shock-absorbing installation assembly is formed with a fixed-installation bottom portion; also comprising ultrasonic vibration components, each ultrasonic vibration component is installed on the inner cavity wall of the accommodating cavity between every two shock-absorbing installation assemblies, to drive the airflow severing blade assembly to perform high frequency ultrasonic airflow severing motions; also comprising a rubber sealing ring assembly, installed to the airflow severing blade assembly around a bottom edge of the accommodating cavity.

Preferably, the airflow severing blade assembly comprises a tapered tip portion and a bottom cavity portion; a transition portion is arranged between the tapered tip portion and the bottom cavity portion to connect the tapered tip portion and the bottom cavity portion as a whole; the accommodating cavity is arranged inside the bottom cavity portion.

Preferably, the inner cavity wall of the accommodating cavity on which top ends of the shock-absorbing installation assemblies and the ultrasonic vibration components are installed is a top flat wall surface of the accommodating cavity.

Preferably, the rubber sealing ring assembly comprises a soft bottom covering edge, an outer top edge, an inner top edge, and a built-in ring groove defined by a space enclosed by the outer top edge and the inner top edge; the soft bottom covering edge is arranged at a bottom edge of the outer top edge.

The beneficial effects of the present invention include: the present invention comprises an airflow severing blade assembly, shock-absorbing installation assemblies, ultrasonic vibration components, and a rubber sealing ring assembly; during operation, the ultrasonic vibration components drive the airflow severing blade assembly to generate high frequency ultrasonic vibrations which sever, break down and destroy air resistance and resistance caused by enwrapping air viscosity, so that the air resistance and the resistance caused by enwrapping air viscosity will not drag a vehicle travelling in high speed, thereby reducing the air resistance and frictional resistance caused by air viscosity as the vehicle is moving, so as to increase travel speed and reduce energy consumption of the vehicle, and increase travel distance. The present invention can be widely installed and applied on various vehicles, such as aircraft, planes, supercars, high-speed rails, ships, and underwater vessels, which reduces the air resistance and frictional resistance caused by air viscosity as the vehicles are moving, so as to increase travel speed and reduce energy consumption of these vehicles, and increase travel distance; meanwhile, high frequency ultrasonic severing motions generate a certain diffusion effect on radar reflections, which provides the vehicles with a certain camouflaging function. Besides, the application of shock-absorbing installation assemblies of the present invention provides small vibration, effective shock-absorption and low noises, with a simple overall structure which is convenient for installation and application, and easy for realization.

DETAILED DESCRIPTION OF THE INVENTION

Figure 1:
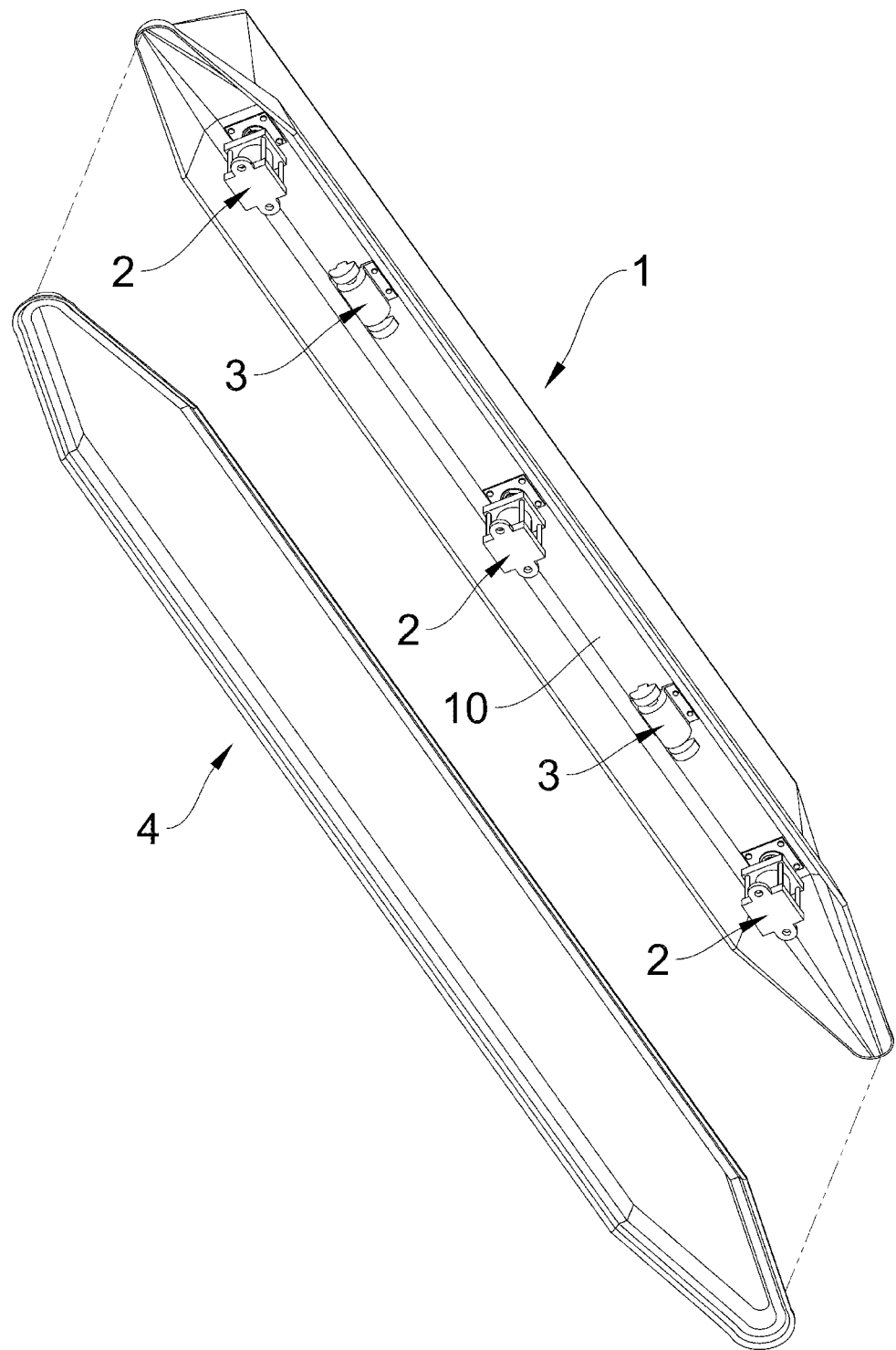
FIG. 1 shows a bottom perspective view of the present invention.
Figure 2:
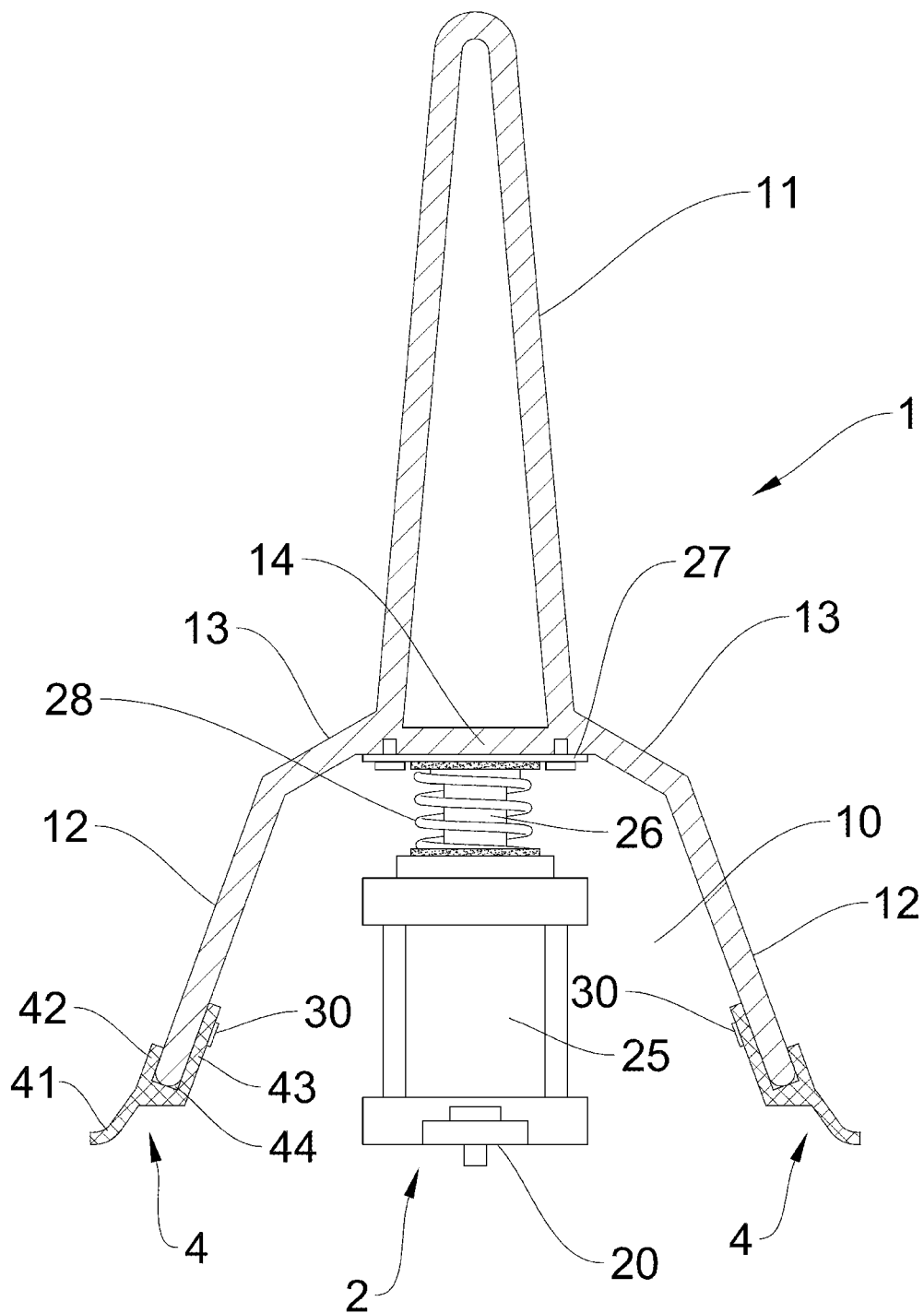
FIG. 2 shows a first sectional view of the present invention.
Figure 3:
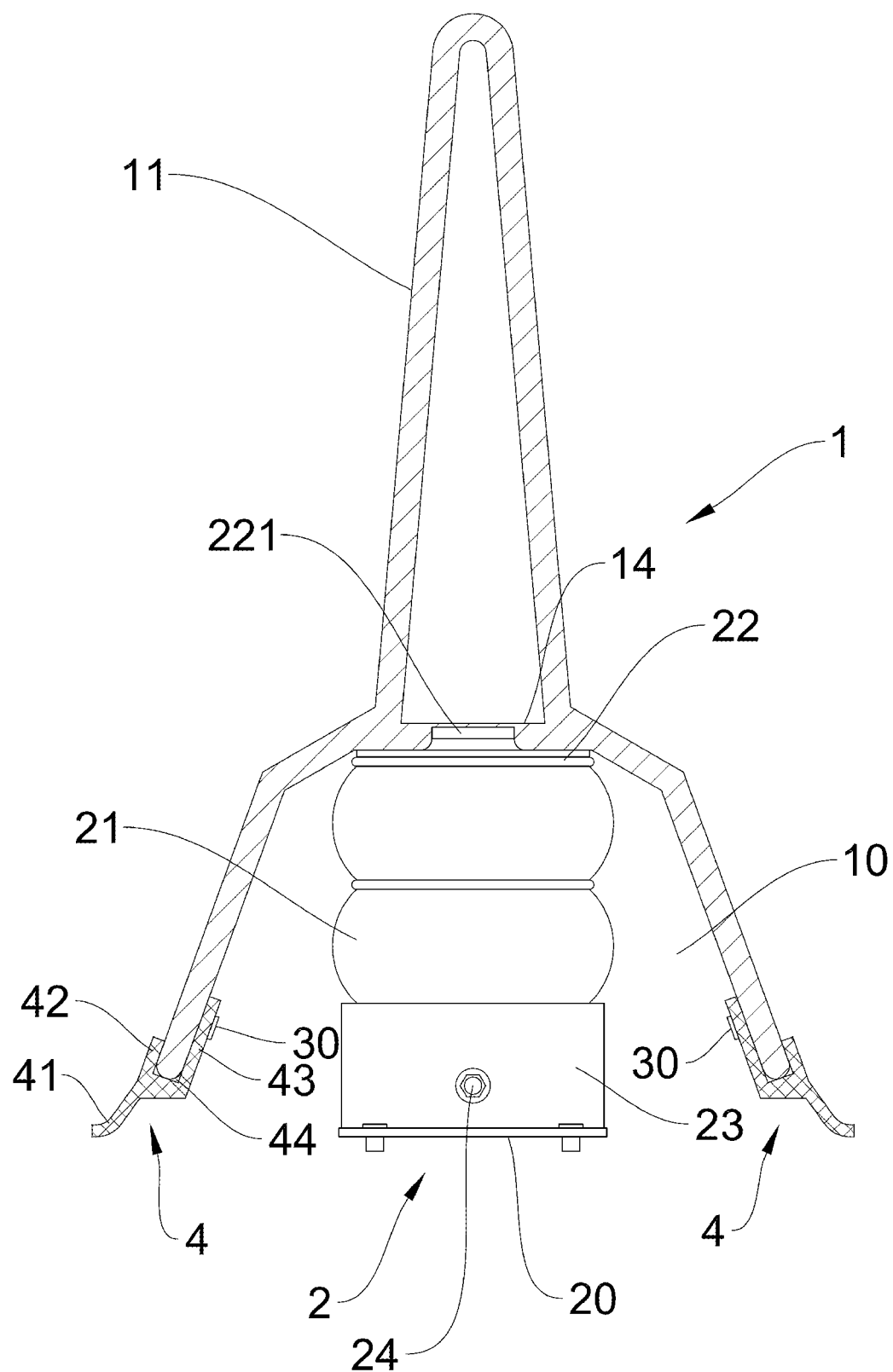
FIG. 3 shows a second sectional view of the present invention.
Figure 4:
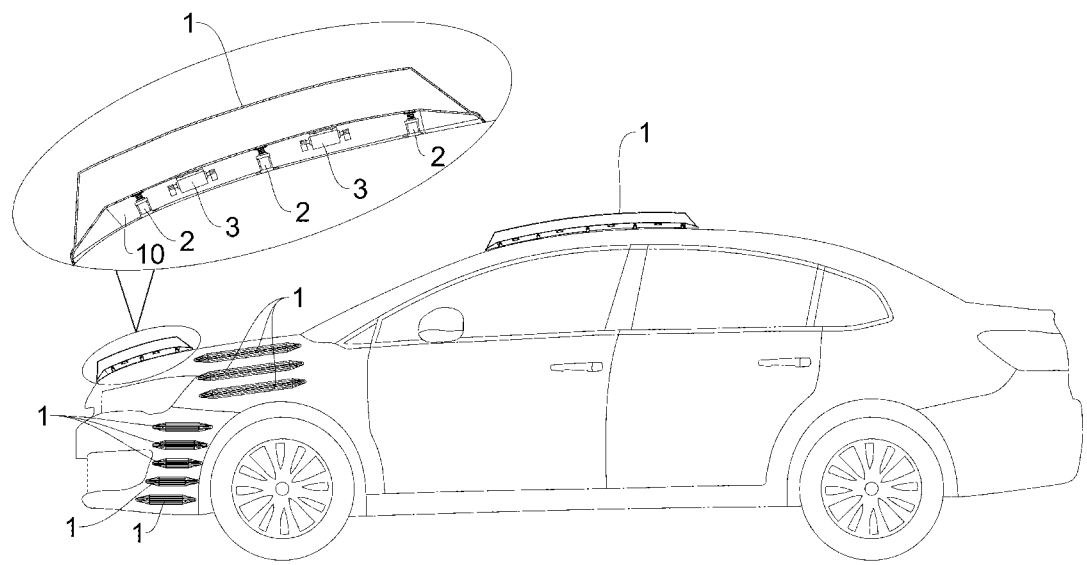
FIG. 4 shows a perspective view of the present invention applied on a supercar.

As illustrated in FIGS. 1-3, an ultrasonic airflow severing resistance reducing device for vehicles, comprising: an airflow severing blade assembly 1, shock-absorbing installation assemblies 2, ultrasonic vibration components 3, and a rubber sealing ring assembly 4; the airflow severing blade assembly is a flat strip-shaped piece with a narrow upper portion and a wide lower portion, and its bottom portion along its lengthwise direction is provided with an accommodating cavity 10. A top end of each shock-absorbing installation assembly 2 is fixedly connected to an inner cavity wall of the accommodating cavity 10; a bottom end of each shock-absorbing installation assembly 2 is formed with a fixed-installation bottom portion 20; the fixed-installation bottom portion 20 is adapted to be fixedly installed on a surface of a vehicle, as illustrated in FIG. 4. The shock-absorbing installation assemblies 2 provide small vibrating effect, effective shock-absorption and low noises for the operation of the ultrasonic vibration components 3. Each ultrasonic vibration component 3 is installed on the inner cavity wall of the accommodating cavity 10 between every two shock-absorbing installation assemblies 2, to drive the high frequency ultrasonic airflow severing motions of the airflow severing blade assembly 1. The ultrasonic vibration assemblies 3 are ultrasonic transducers of 1 MHz or above, or ultrasonic vibration motors with ten thousand revolutions per minute (RPM) or more, thereby achieving better airflow severing efficiency. The rubber sealing ring assembly 4 is installed to the airflow severing blade assembly 1 around a bottom edge of the accommodating cavity 10. The purpose of the rubber sealing ring assembly 4 is to ensure the relative tightness between the airflow severing blade assembly 1 and an installation surface of a vehicle, so as to prevent airflow or rainwater from entering the accommodating cavity 10.

As illustrated in FIG. 2 or FIG. 3, to provide the airflow severing blade assembly 1 with a simple structure easy to process and having good aerodynamic performance, the airflow severing blade assembly 1 comprises a tapered tip portion 11 and a bottom cavity portion 12; a transition portion 13 is arranged between the tapered tip portion 11 and the bottom cavity portion 12 to connect the two portions as a whole; the accommodating cavity 10 is arranged inside the bottom cavity portion 12. To further reduce the weight of the airflow severing blade assembly 1, as illustrated in FIG. 2 and FIG. 3, the tapered tip portion 11 is a tapered shape part with a hollow structure.

As illustrated in FIG. 2 or FIG. 3, the inner cavity wall of the accommodating cavity 10 on which the shock-absorbing installation assemblies 2 and the ultrasonic vibration components 3 are installed is a top flat wall surface 14 of the accommodating cavity 10; a top end of each shock-absorbing installation assembly 2 and the ultrasonic vibration components 3 are fixedly installed on the top flat wall surface 14. The top flat wall surface 14 significantly facilitates the fixed installation of the shock-absorbing installation assemblies 2 and ultrasonic vibration components 3, making their installation and fixation more convenient and simple.

As illustrated in FIG. 2 or FIG. 3, to provide the rubber sealing ring assembly 4 with a simple, reasonable structure and good blocking performance, the rubber sealing ring assembly 4 comprises a soft bottom covering edge 41, an outer top edge 42, an inner top edge 43, and a built-in ring groove 44 defined by a space enclosed by the outer top edge 42 and the inner top edge 43; the soft bottom covering edge 41 is arranged at a bottom edge of the outer top edge 42. The soft bottom covering edge 41 is adopted to removably and freely abut on a surface of a vehicle, so as to prevent dust, rainwater and airflow from entering into the accommodating cavity 10, and avoid increasing resistance caused by the airflow entering into the accommodating cavity 10. The built-in ring groove 44 and an outer side edge of the accommodating cavity 10 are fitted with each other.

As illustrated in FIG. 2 or FIG. 3, a vertical height of the inner top edge 43 is larger than a vertical height of the outer top edge 42, which is convenient to fix the inner top edge 43 with screws 30, so that the rubber sealing ring assembly 4 is not easy to fall off.

The shock-absorbing installation assemblies 2 are soft rubber shock-absorbing columns, spring columns, airbag shock-absorbing parts, or hydraulic cylinder parts. In the present embodiment, an example of a hydraulic cylinder part as a shock-absorbing installation assembly 2 is illustrated in FIG. 2, and an example of an airbag shock-absorbing part as a shock-absorbing installation assembly 2 is illustrated in FIG. 3.

As illustrated in FIG. 3, when an airbag shock-absorbing part is adopted, to increase adaptability between the airbag shock-absorbing part and the airflow severing blade assembly 1, the airbag shock-absorbing part comprises a rubber airbag body 21, an upper metal end cap 22 and a lower metal end cap 23 respectively arranged on an upper end and a lower end of the rubber airbag body 21; a threaded connection portion 221 is arranged on an upper side of the upper metal end cap 22; a bottom side of the lower metal end cap 23 is provided with the fixed-installation bottom portion 20; an inflator nozzle part 24 connected to the rubber airbag body 21 is arranged on the lower metal end cap 23; the inflator nozzle part 24 is adapted to connect to an air source for adjusting the air pressure of the rubber airbag body 21, thereby achieving better shock-absorbing performance.

As illustrated in FIG. 2, when a hydraulic cylinder part is adopted, to increase adaptability between the hydraulic cylinder part and the airflow severing blade assembly 1, the hydraulic cylinder part comprises a hydraulic cylinder body 25, a piston rod 26 installed on the hydraulic cylinder body 25, a top connection piece 27 installed on a top end of the piston rod 26, and a reset spring 28 fitted on the piston rod 26; the reset spring 28 is adopted to increase the reset speed of the piston rod 26, thereby achieving better overall shock-absorbing performance. A bottom part of the hydraulic cylinder body 25 is provided with the fixed-installation bottom portion 20.

Figure 5:
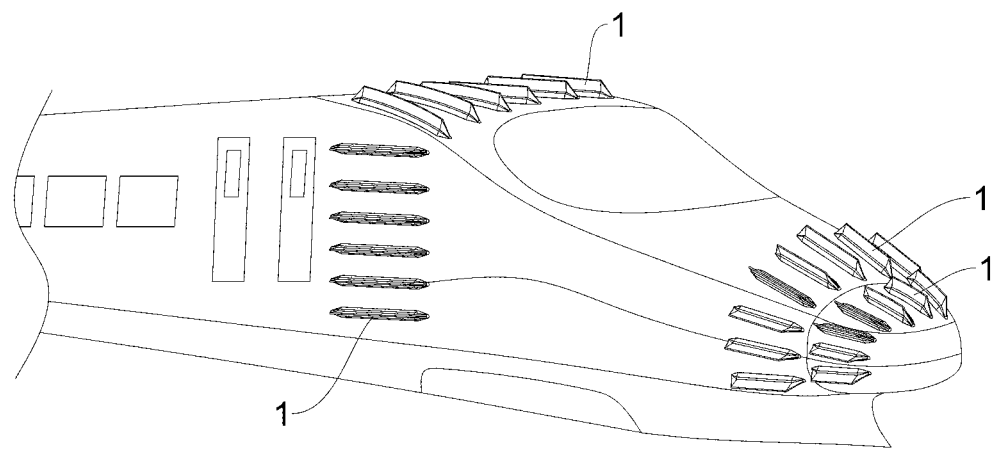
FIG. 5 shows a perspective view of the present invention applied on a high-speed rail.
Figure 6:
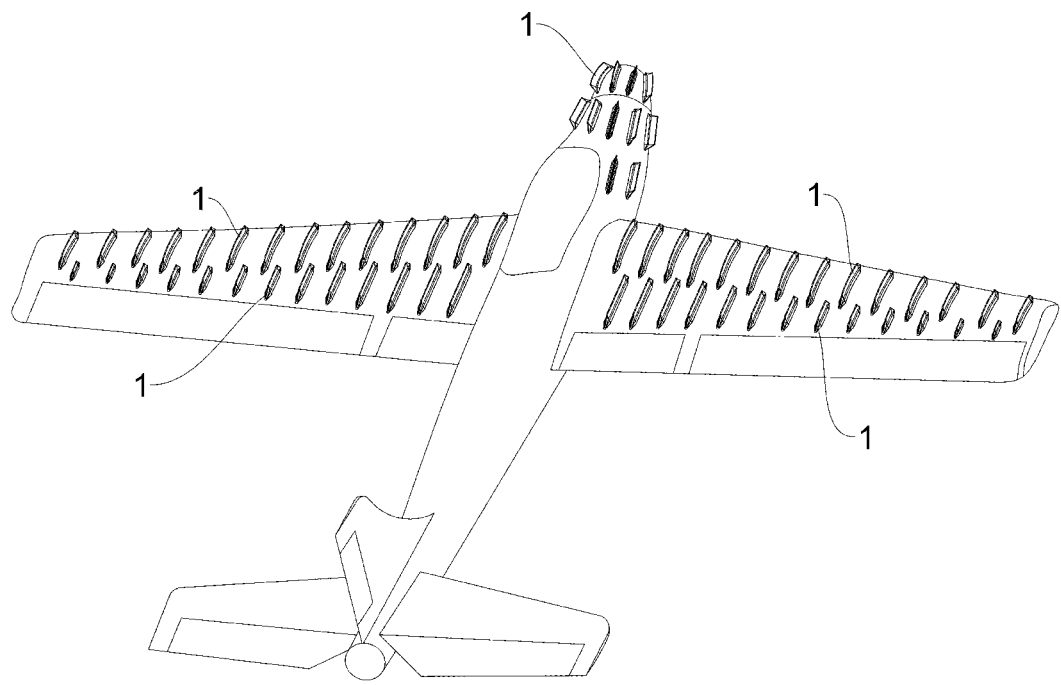
FIG. 6 shows a perspective view of the present invention applied on a plane.
Figure 7:
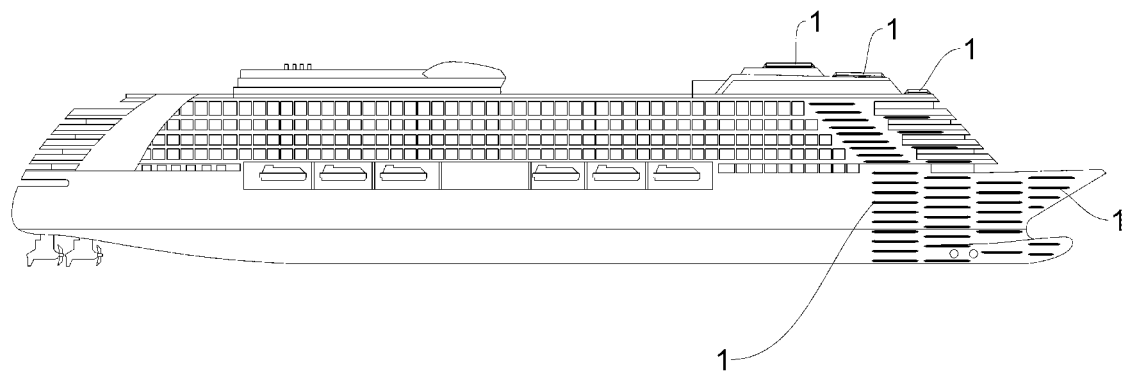
FIG. 7 shows a perspective view of the present invention applied on a ship.

The present invention can be widely installed and applied on various vehicles; for instances, applying the present invention on a plane as illustrated in FIG. 6, or applying the present invention on a supercar as illustrated in FIG. 4, applying the present invention on a high-speed rail as illustrated in FIG. 5, or applying the present invention on a ship as illustrated in FIG. 7, which reduces air resistance and frictional resistance caused by air viscosity when these vehicles are travelling, so as to increase travel speed and reduce energy consumption of these vehicles, and increase travel distance. Meanwhile, in specific applications, as illustrated in FIG. 5 and FIG. 6, the devices of the present invention are arranged in a staggered manner, so that air flowing from the front to the back of the vehicle is repeatedly severed and broken down, thereby achieving an excellent resistance reduction effect. Furthermore, when the present invention is applied on an underwater vessel, in specific implementations, the ultrasonic vibration components 3 should be designed as waterproof, such as incorporating a water-resistant cover to provide them with a waterproof function. When being applied on an underwater vessel, the airflow severing resistance reducing device generates ultra-high frequency ultrasonic severing motions, which produce an ultra-high-speed cavitation effect and creates millions of air bubbles in the water flowing against the forward moving direction of the vehicle, thereby further reducing the resistance when the vehicle is moving forward by reducing the density of the water flowing against the forward moving direction of the vehicle, so as to increase its travel speed and travel distance, and reduce energy consumption.

What is claimed is:

1. An ultrasonic airflow severing resistance reducing device for vehicles, comprising an airflow severing blade assembly, the airflow severing blade assembly is a flat strip-shaped piece with an upper portion and a lower portion, the upper portion is narrower than the lower portion, and a bottom portion of the airflow severing blade assembly along a lengthwise direction thereof is provided with an accommodating cavity;
   shock-absorbing installation assemblies, a top end of each shock-absorbing installation assembly is fixedly connected to an inner cavity wall of the accommodating cavity, a bottom end of each shock-absorbing installation assembly is formed with a fixed-installation bottom portion;
   ultrasonic vibration components, each ultrasonic vibration component is installed on the inner cavity wall of the accommodating cavity between every two shock-absorbing installation assemblies, to drive the airflow severing blade assembly to perform high frequency ultrasonic airflow severing motions;
   a rubber sealing ring assembly, installed to the airflow severing blade assembly around a bottom edge of the accommodating cavity.

2. The ultrasonic airflow severing resistance reducing device for vehicles of claim 1, wherein the airflow severing blade assembly comprises a tapered tip portion and a bottom cavity portion; a transition portion is arranged between the tapered tip portion and the bottom cavity portion to connect the tapered tip portion and the bottom cavity portion as a whole; the accommodating cavity is arranged inside the bottom cavity portion.

3. The ultrasonic airflow severing resistance reducing device for vehicles of claim 2, wherein the tapered tip portion is a tapered shape part with a hollow structure.

4. The ultrasonic airflow severing resistance reducing device for vehicles of claim 2, wherein the inner cavity wall of the accommodating cavity on which top ends of the shock-absorbing installation assemblies and the ultrasonic vibration components are installed is a top flat wall surface of the accommodating cavity.

5. The ultrasonic airflow severing resistance reducing device for vehicles of claim 2, wherein the rubber sealing ring assembly comprises a soft bottom covering edge, an outer top edge, an inner top edge, and a built-in ring groove defined by a space enclosed by the outer top edge and the inner top edge; the soft bottom covering edge is arranged at a bottom edge of the outer top edge.

6. The ultrasonic airflow severing resistance reducing device for vehicles of claim 5, wherein a vertical height of the inner top edge is larger than a vertical height of the outer top edge.

7. The ultrasonic airflow severing resistance reducing device for vehicles of claim 1, wherein the shock-absorbing installation assemblies are soft rubber shock-absorbing columns, spring columns, airbag shock-absorbing parts, or hydraulic cylinder parts.

8. The ultrasonic airflow severing resistance reducing device for vehicles of claim 7, wherein each airbag shock-absorbing part comprises a rubber airbag body, an upper metal end cap and a lower metal end cap respectively arranged on an upper end and a lower end of the rubber airbag body; a threaded connection portion is arranged on an upper side of the upper metal end cap; a bottom side of the lower metal end cap is provided with the fixed-installation bottom portion; an inflator nozzle part connected to the rubber airbag body is arranged on the lower metal end cap.

9. The ultrasonic airflow severing resistance reducing device for vehicles of claim 7, wherein each hydraulic cylinder part comprises a hydraulic cylinder body, a piston rod installed on the hydraulic cylinder body, a top connection piece installed on a top end of the piston rod, and a reset spring fitted on the piston rod; bottom part of the hydraulic cylinder body is provided with the fixed-installation bottom portion.

10. The ultrasonic airflow severing resistance reducing device for vehicles of claim 1, wherein the ultrasonic vibration assemblies are ultrasonic transducers of 1 MHz or above, or ultrasonic vibration motors with ten thousand revolutions per minute or more.

* * * * *